Figure 1:
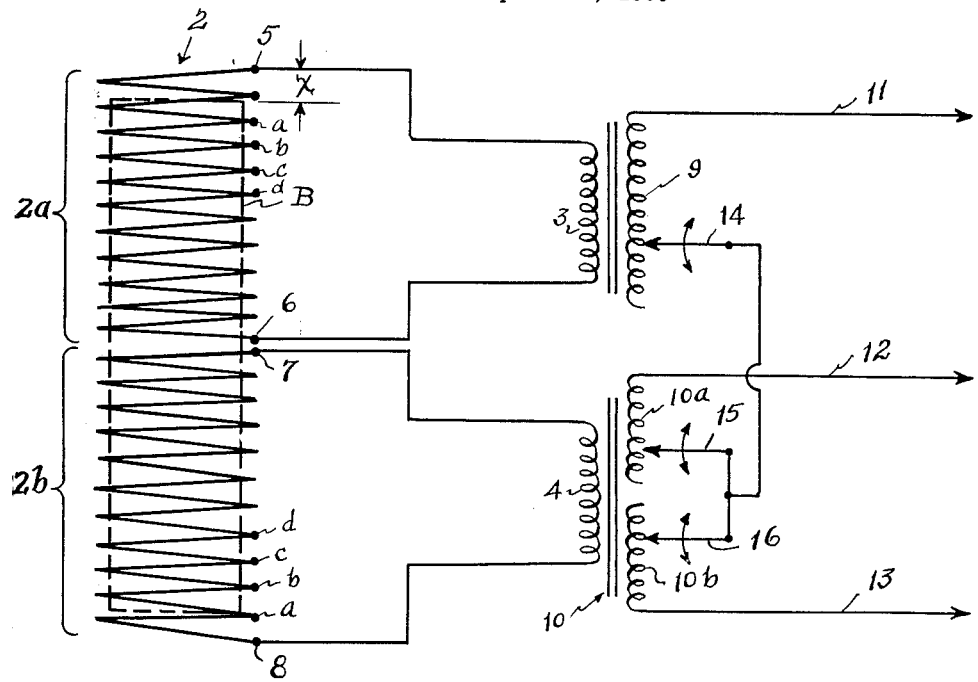

Oct. 11, 1955  R. V. LACKNER  2,720,576
ELECTRICAL BILLET HEATER
Filed April 10, 1953

INVENTOR
Robert V. Lackner
By Christy, Parmelee & Strickland
his attorneys

United States Patent Office 2,720,576
Patented Oct. 11, 1955

2,720,576

ELECTRICAL BILLET HEATER

Robert V. Lackner, Pittsburgh, Pa., assignor to Loftus Engineering Corporation, Pittsburgh, Pa., a corporation of Maryland Application April 10, 1953, Serial No. 347,873

2 Claims. (Cl. 219—10.75)

My invention relates to the induction heating of metal billets by low-frequency electrical current, and consists of certain new and useful improvements in apparatus for efficiently heating billets of various lengths in one and the same induction coil.

The invention is particularly directed to the heating of non-ferrous billets, such as billets of aluminum, or magnesium, or copper, and alloys thereof. It has been generally recognized that a single-phase coil is effective, when energized with low-frequency (say 60 cycle) current, to heat non-ferrous billets with efficiency upward of 70%, and that such a single-phase coil is readily adapted to heat billets of various lengths. A practical problem, however, precludes the universal use by industry of single-phase coils, particularly where the required electrical power is obtained from existing power plants that furnish three-phase current. The load demand for any industrial application of induction heating is relatively high, and in the case of a single-phase coil such load is imposed on only one of the three phases of the power supply, thus seriously unbalancing the power distribution system of the power plant. In consequence of this circumstance, the recent trend of certain of the induction furnace builders has been towards the use of three-phase coils—a three-phase coil being formed of three single-phase coil sections arranged end to end on common axis. Each of the three coil sections is connected to one phase of the power supply, whereby theoretically all three phases of the power supply are balanced. When a three-phase coil is designed for a billet of given diameter and given length the results in service are satisfactory, insofar as the balancing of the three phases of the power supply system is concerned, although the uniformity of heating is not as good as that obtained with a single-phase coil. When, however, the coil is used for billets of different lengths than those for which the coil was designed, there is an objectionable unbalancing of the load as between the three phases of the power supply system. That is to say, when a shorter billet than that for which the coil is designed, is centered, as it should be, on the longitudinal axis of a three-phase coil, the billet extends equally from the opposite ends of medial coil section partway only into the two end coil sections abutting the opposite ends of the said medial coil section. In consequence the current drawn by the two coil sections during the heating of the billet is substantially less than the current drawn by the medial section, and the two phases of the power supply that are severally connected to the two end coil sections are objectionably unbalanced with respect to the phase that supplies the medial section, and this unbalanced condition of the phases cannot be corrected by tapping the axial outer electrical leads of the end coil sections into the turns of the latter coil sections at points within the outer ends of such sections. Thus, a problem has existed hitherto in the art, and my invention is directed to a solution of the problem.

The object of the invention is to provide electrical billet-heating apparatus having a multi-phase coil which is adapted efficiently to heat billets of various lengths while operating on a low-frequency, substantially balanced, three-phase power supply.

Figure 2:
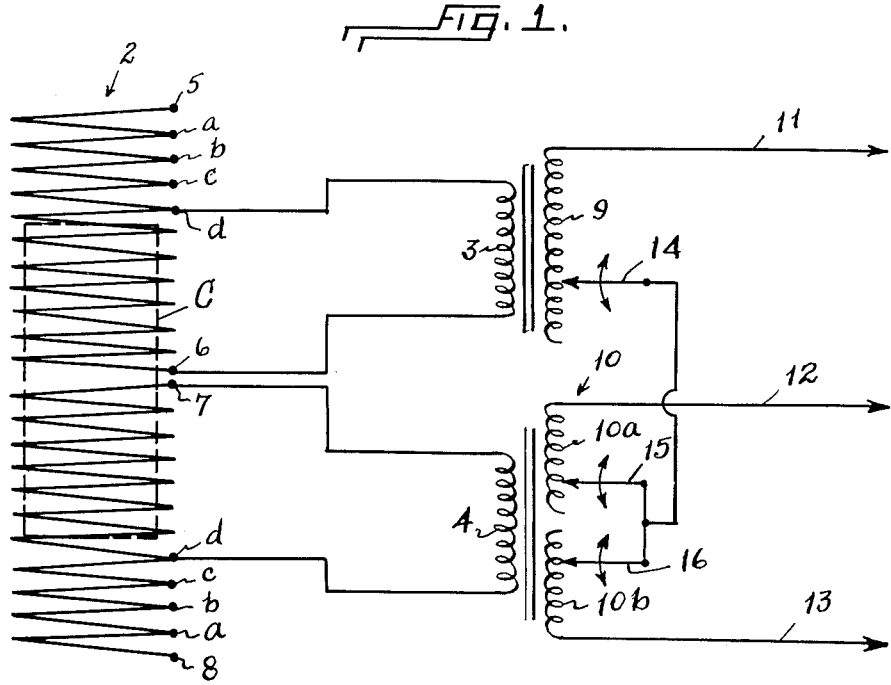

The invention will be understood upon reference to the accompanying drawings, in which:

Fig. 1 is a diagrammatic view, illustrating an induction heating coil and the transformer for energizing the coil from a three-phase power supply. A billet of specified diameter and of the maximum length, for which the coil was designed, is indicated in dotted lines in the coil in position for heating; and Fig. 2 is a diagrammatic view of the apparatus as it is adjusted for heating a billet of substantially the same diameter, but of less length.

An induction billet-heating coil is diagrammatically represented at 2 in the drawings, and the construction of the coil may correspond to the coils disclosed in structural detail in my copending patent applications Serial No. 329,390, filed January 2, 1953, and Serial No. 340,209, filed March 4, 1953.

In accordance with my invention the coil 2 is indeed two coils 2a and 2b of water-cooled copper conductor bar. The two coils are arranged end to end on common axis, and in a mechanical sense the two coils form a tube whose wall is formed by the tightly coiled copper bar, with the adjacent turns of the coil separated only by interposed electrical insulation. A wear resistant liner (cf. my copending applications) is secured within the tube formed by the coils and the tube and its liner correspond in cross section to the billets to be heated therein. In length the tube or two-sectioned coil exceeds the longest billet to be heated by a distance $x$ at each end, $x$ varying from $1\frac{1}{2}''$ to $4''$ or more, depending upon the diameter or thickness of the billets to be heated. The billet which the two-sectioned coil is designed to heat to extrusion, or forging, or rolling temperature is indicated in dotted lines at B.

The two sections 2a and 2b of the coil are severally connected to the two secondaries 3 and 4 of a conventional Scott transformer arrangement or assembly, whose primaries are indicated at 9 and 10. The inner and outer end terminals 5 and 6 of one section of the induction coil are connected to the secondary 3, while the corresponding terminals 7 and 8 of the other coil section are connected to the secondary 4, as shown in the drawing. The transformer primary 9 comprises a single coil connected at one of its two terminals by a feeder 11 to one phase of a three-phase conventional low-frequency power supply. The transformer primary 10 comprises two coil sections or portions 10a and 10b, coil section 10a being connected at one of its terminals by a feeder 12 to the second phase of the power supply, and the coil sections 10b being connected at one of its terminals by a feeder 13 to the third phase of the said power supply. The second terminal of each of the primary coil components comprises a tap-changing contactor, the tap-changing contactor for coil 9 being shown at 14, the one for coil section 10a being shown at 15, and that of the coil section 10b being shown at 16. The three tap-changing contactors 14, 15, 16 are bridge-connected, as indicated, and all three may be adjusted in unison, or each may be adjusted individually. By such adjustment the transformer ratio between primaries and secondaries is varied, thereby regulating the power input to the two sections of the induction coil. By virtue of the arrangement the two sections and of the induction coil are uniformly energized and operate with uniform effect, to cause current to flow in the body of the billet B and to generate heat therein in known way, until the billet is heated to desired temperature, whereupon the electrical power is switched off and the billet removed from the coil and passed to the extrusion press or other metal-working apparatus intended to receive it. The conditions of equilibrium are made readily possible in the apparatus because the billet is centered in the coil 2, with the same mass of metal lying within each of the coil sections 2a and 2b. The described regulation of the power input to the two sections of the induction coil in turn regulates the rate of heating the billets, and it is important to note that the adjustment of the tap-changing contactors permits variations or regulation of the power applied to one coil section (2a) with respect to the other (2b).

As already mentioned the billet B is the maximum length of billet for which the coil 2 is designed. The principal feature of my invention resides in the adaptability of the coil 2 to heat billets shorter than the billet B, while permitting an uniform balance to be established and maintained among the three phases of the power supply. In combination with the Scott transformer arrangement, I provide on each section of 2a and 2b of the coil 2 a series of taps a, b, c, d, etc., extending inwardly from the outer ends or end terminals 5 and 8 of the two coil sections, and by virtue of these taps the connections to the outer ends of the secondaries 3 and 4 of the transformer arrangement may be made at selected points in the coil sections within the said outer terminals 5 and 8. Thus, the electrical length of each induction coil section may be varied, and varied symmetrically with respect to the central transverse plane of the two-sectioned induction coil, that is, a transverse plane that extends in this case between the inner or medial terminals 6 and 7 of the two coil sections. Thus, the effective or electrical length of this two-phase induction coil may be adjusted to billets of various lengths less than the length of the billet B. I am aware that it is not unusual to provide series taps on various sorts of electrical coils, but so far as I am aware no one has hitherto provided such taps symmetrically on the two coil sections of a double phase coil in combination a transformer arrangement for utilizing a three-phase, low-frequency power supply while keeping all three phases in substantial balance.

In Fig. 2 a relatively short billet C is shown positioned centrally in the two-phase or two-sectioned coil 2, and the outer terminals of the secondaries 3 and 4 of the transformer arrangement are connected to the taps d, d of the coil sections 2a and 2b. The electrical length of the two-phase induction coil is now equal to the distance between the two taps d, d and it will be perceived that the billet C is located precisely at the center of such electrical length, with the said electrical length exceeding the billet length at each end by the required distance. The transformer contacts are now adjusted, if need be, to establish a phase balance of the current flowing in the three feeders 11, 12 and 13, and of the current flowing in the two sections of the induction coil. The billet C may thus be heated uniformly with power derived from a balanced three-phase system.

The apparatus, manifestly, may be adjusted to heat billets of greater or less length than the billet C but within the length than the billet B.

Great practical advantages are realized in consequence of the apparatus and method of my invention. The electrical efficiency of my apparatus in the case of heating aluminum billets is approximately 68 per cent, whereas the corresponding efficiency of a single phase coil is approximately 70 per cent. For all practical purposes, therefore, the practice of my invention yields substantially all of the advantages of a single-phase coil for heating billets of various lengths without the serious disadvantages of unbalancing the three-phase power supply system, and all of the disadvantages of three-phase coils are eliminated.

I claim:

1. An induction furnace for heating metal billets to working temperature, said furnace comprising a single induction coil formed of two electrical induction coil sections assembled and secured end to end, a wear-resistant liner secured within the axially aligned sections to form a tubular container for the billets to be heated, each of said coil sections having at least two taps, one tap of each coil section comprising a medial tap arranged adjacent to the medial tap of the other coil section substantially at the medial transverse plane of the assembled two-sectioned coil, a Scott transformer arrangement having two secondary coils each having two terminals, the medial terminals of said heating coil sections being severally connected to two of the terminals of said transformer secondary coils, the other of said terminals of the transformer secondary coils being severally connected to two of the taps of the heating coil sections at points located at substantially equal distances from and on opposite sides of said medial transverse plane of the two-sectioned coil, said transformer arrangement having three primary coil portions, one for each phase of a three-phase, low-frequency power supply system for exciting said two secondary coils of the transformer, and means for adjusting the transformer arrangement ratio between said primary and secondary coils of the transformer to balance the currents flowing in the three phases, whereby equalized current flow is induced in the billets in said tubular container and the billets thereby heated to working temperature.

2. An induction furnace for heating metal billets to working temperature, said furnace comprising a single induction coil formed of two electrical induction coil sections assembled and secured end to end, a wear-resistant liner secured within the axially aligned sections to form a tubular container for the billets to be heated, each of said coil sections having at least two taps, one tap of each coil section comprising a medial tap arranged adjacent to the medial tap of the other coil section substantially at the medial transverse plane of the assembled two-sectioned coil, a Scott transformer arrangement having two secondary coils each having two terminals, the medial terminals of said heating coil sections being severally connected to two of the terminals of said transformer secondary coils, the other of said terminals of the transformer secondary coils being severally connected to two of the taps of the heating coil sections at points located at substantially equal distances from and on opposite sides of said medial transverse plane of the two-sectioned coil, said transformer arrangement having three primary coil portions, one for each phase of a three-phase, low-frequency power supply system for exciting said two secondary coils of the transformer, and means for adjusting the transformer arrangement ratio between said primary and secondary coils of the transformer to balance the currents flowing in the three phases, whereby equalized current flow is induced in the billets in said tubular container and the billets thereby heated to working temperature, together with additional taps provided on said heating coil sections for varying the electrical length of said coil sections equally and symmetrically of the said transverse plane of the two-sectioned induction coil, whereby the total electrical length of the two coil sections may be adjusted to the overall length of the billets to be heated.

References Cited in the file of this patent

UNITED STATES PATENTS

| | | |
|---|---|---|
| 1,430,987 | Hanff | Oct. 3, 1922 |
| 2,623,081 | Schorg | Dec. 23, 1952 |